US008061757B1

(12) United States Patent  (10) Patent No.: US 8,061,757 B1
Moore et al.  (45) Date of Patent: Nov. 22, 2011

(54) FORCE ASSIST FOR SUNSHADE CLOSING SLIDE MECHANISM

(75) Inventors: Jaime Nicole Moore, Canton, MI (US); Devon Marie Ross, Howell, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/873,855

(22) Filed: Sep. 1, 2010

(51) Int. Cl.
  *B60J 3/02* (2006.01)
(52) U.S. Cl. .................. 296/97.4; 296/97.8; 160/370.22
(58) Field of Classification Search ................. 296/97.1, 296/97.4, 97.7, 97.8; 160/370.22
  See application file for complete search history.

(56) References Cited

U.S. PATENT DOCUMENTS

| | | | | |
|---|---|---|---|---|
| 1,157,879 | A | * | 10/1915 | Loomis .......................... 296/152 |
| 4,836,263 | A | * | 6/1989 | Ament ............................. 160/68 |
| 5,468,040 | A | * | 11/1995 | Peng Hsieh et al. ......... 296/97.4 |
| 5,562,144 | A | | 10/1996 | Ming-Shun |
| 6,047,762 | A | | 4/2000 | Anderson |
| 6,079,474 | A | | 6/2000 | Lin |
| 6,135,192 | A | * | 10/2000 | Suzuki et al. ............. 160/370.22 |
| 6,216,762 | B1 | * | 4/2001 | Lin ........................... 160/370.22 |
| 6,422,291 | B1 | * | 7/2002 | Brunnert et al. ......... 160/370.22 |
| 6,427,751 | B1 | * | 8/2002 | Schlecht et al. ......... 160/370.22 |
| 6,557,616 | B2 | * | 5/2003 | Schlect ..................... 160/370.22 |
| 6,668,902 | B2 | * | 12/2003 | Bong ........................ 160/370.22 |
| 6,834,705 | B2 | * | 12/2004 | Seel .......................... 160/370.22 |
| 7,014,243 | B2 | * | 3/2006 | Nakajo ......................... 296/97.4 |
| 7,228,884 | B2 | * | 6/2007 | Chen ........................ 160/370.22 |
| 7,673,925 | B2 | * | 3/2010 | Lin .............................. 296/97.4 |
| 7,686,375 | B1 | * | 3/2010 | Schlotterer et al. .......... 296/97.8 |
| 7,828,039 | B2 | * | 11/2010 | Starzmann et al. ...... 160/370.22 |
| 7,896,057 | B2 | * | 3/2011 | Walter et al. ............. 160/370.22 |
| 7,942,463 | B2 | * | 5/2011 | Starzmann et al. ........... 296/143 |
| 2010/0170645 | A1 | * | 7/2010 | Lin ............................... 160/370 |

FOREIGN PATENT DOCUMENTS

CN  2535260 Y  2/2003

* cited by examiner

*Primary Examiner* — Jason S Morrow
(74) *Attorney, Agent, or Firm* — Gifford, Krass, Spinkle, Anderson & Citkowski, P.C.

(57) ABSTRACT

An automotive vehicle sunshade assembly for controlling light entering a vehicle interior is provided having an elongated rotatable member, a flexible shade wrapped around the elongated rotatable member having a first edge connected to the rotatable member, and a second edge connected to an elongated extension member. Two support arms extend between the elongated extension member and the base profile and are operable to unroll the flexible shade from a elongated rotatable member thereby covering a vehicle window. Furthermore, an end cap is affixed to at least the first end of the elongated extension member. The elongated extension member further having at least one channel or track disposed therein. A biasing member is positioned within the at least one channel between the support arm and the end cap operable to force movement of the support arm during retraction of the flexible shade.

15 Claims, 3 Drawing Sheets

FORCE ASSIST FOR SUNSHADE CLOSING SLIDE MECHANISM

FIELD OF THE INVENTION

This invention relates generally to automotive vehicle sunshade assemblies. More particularly, this invention relates to automatic rolling automotive vehicle sunshade assemblies for motor vehicles.

BACKGROUND OF THE INVENTION

Automatic and electronically operated sunshade assemblies are more frequently being used in motor vehicles as a means to block out unwanted sun within a vehicle interior. Such sunshade assemblies commonly include a gear which drives two arms to rotate a shade up a window. The arms have a sliding member which slide along a track during actuation. The shade stops in the fully open position when the sliding members hit the end cap within the track. When closing the shade, the gear reverses direction rotating the arms to retract the shade to a closed position. The arms actuate the sliding member within the track as the shade retracts. However, the length of the shade and angle of the arms in the extended position create difficulty when closing or retracting the shade. The sliding members therefore do not slide smoothly within the track. Accordingly, it is highly desirable to provide a fix to this problem wherein the sliding member and the arms are able to smoothly travel within the track.

SUMMARY OF THE INVENTION

An automotive vehicle sunshade assembly for controlling light entering a vehicle interior is provided having an elongated rotatable member, a flexible shade wrapped around the elongated rotatable member having a first edge connected to the rotatable member, and a second edge connected to an elongated extension member. Two support arms extend between the elongated extension member and the base profile and are operable to unroll the flexible shade from a elongated rotatable member thereby covering a vehicle window. Furthermore, an end cap is affixed to at least the first end of the elongated extension member. The elongated extension member further having at least one channel or track disposed therein. A biasing member, typically a spring, is positioned within the at least one channel between the support arm and the end cap operable to force movement of the support arm during retraction of the flexible shade.

DETAILED DESCRIPTION OF THE INVENTION

The present invention provides for an automotive vehicle sunshade assembly for controlling light entering a vehicle providing a force assist for closing or retracting the sunshade assembly. The force assist mechanism uses a biasing member or a spring to force retraction of the sunshade assembly.

Figure 1:
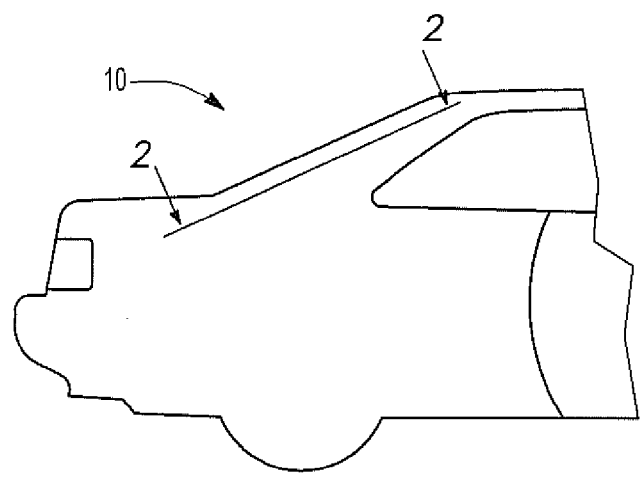
FIG. 1 is a side view of an automotive vehicle showing the placement of the sunshade assembly.
Figure 2:
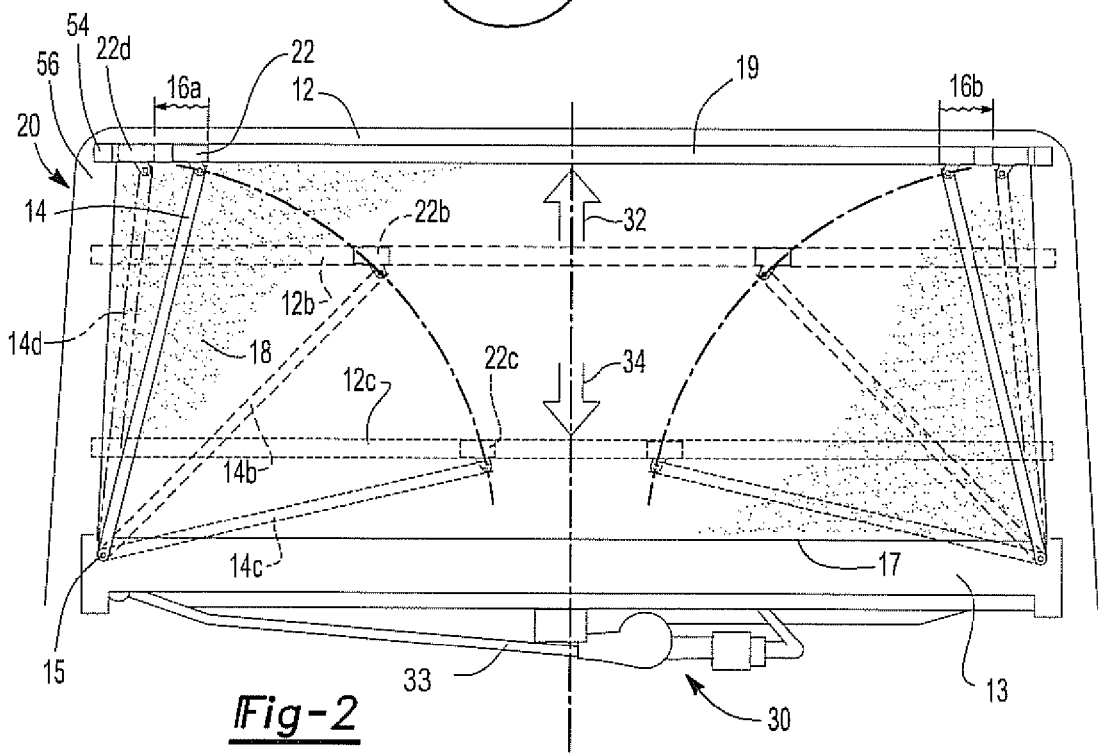
FIG. 2 is a top vehicle rear view of the sunshade assembly showing movement of the retractable sunshade.
Figure 3:
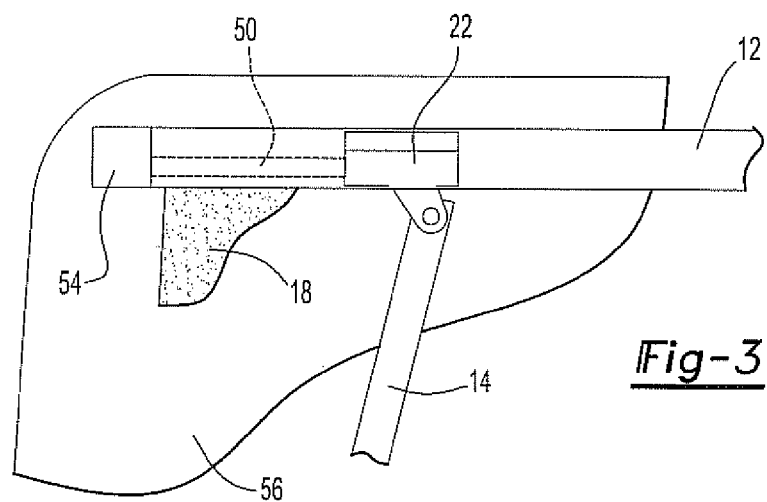
FIG. 3 is a close up view of the biasing member or stopper disposed within a channel wherein the sliding member abuts the biasing member or stopper.
Figure 4:
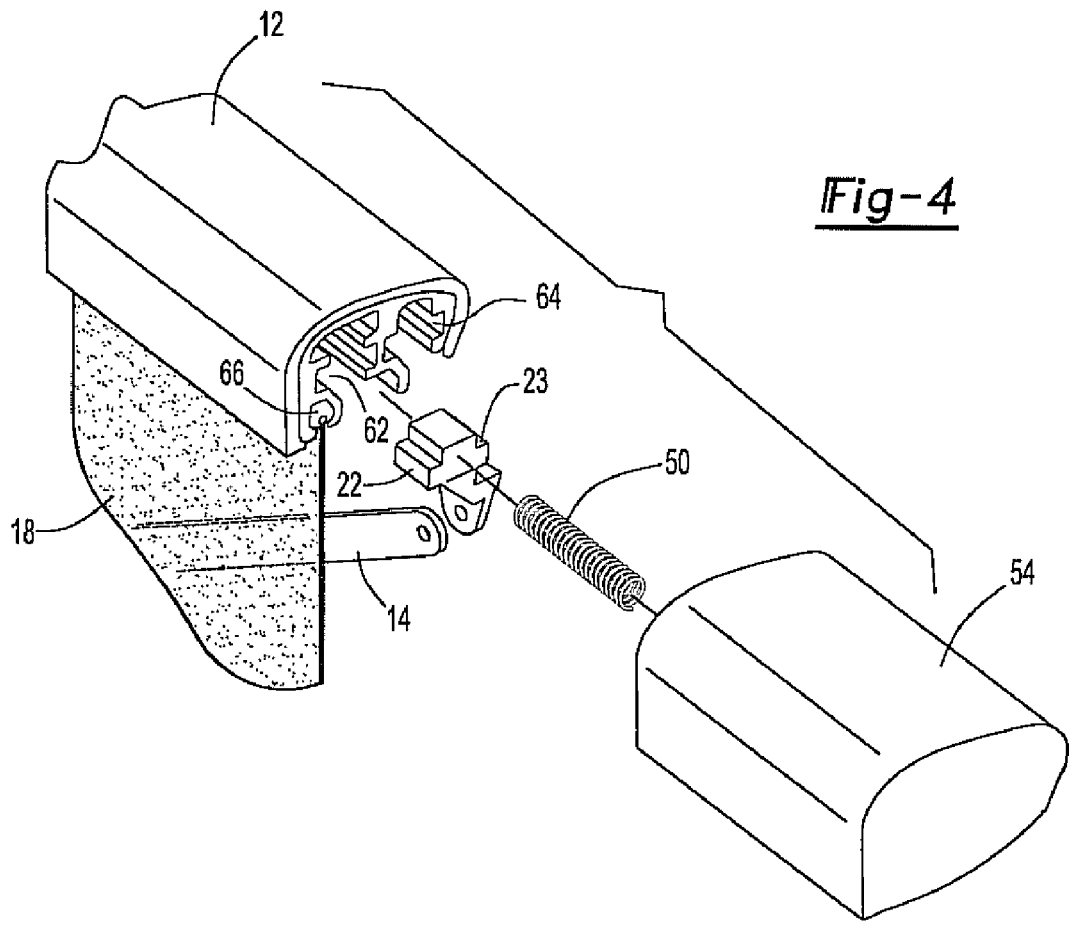
FIG. 4 is an exploded perspective view depicting the end cap, sliding member, and biasing member.
Figure 5:
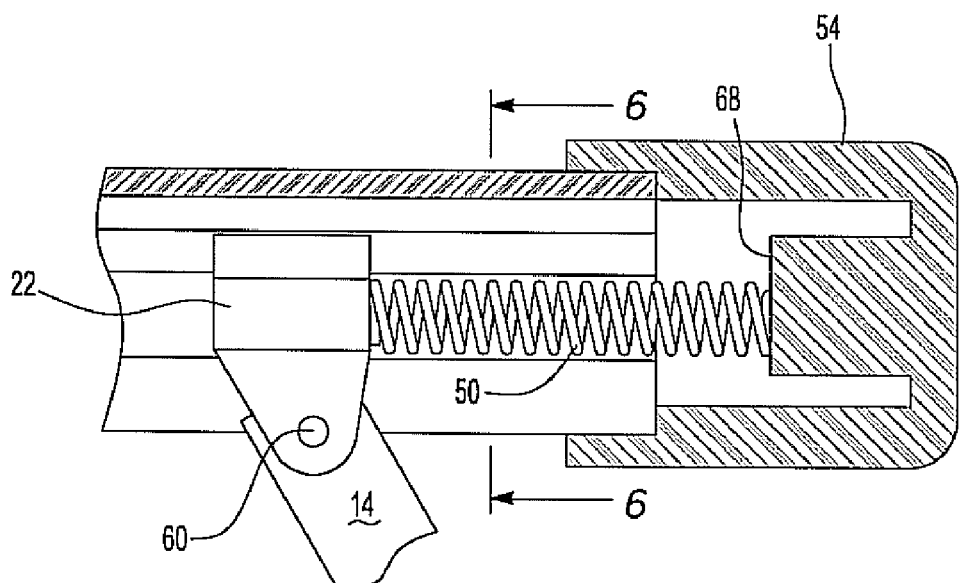
FIG. 5 is a backside view showing the sliding member, biasing member, and end cap.
Figure 6:
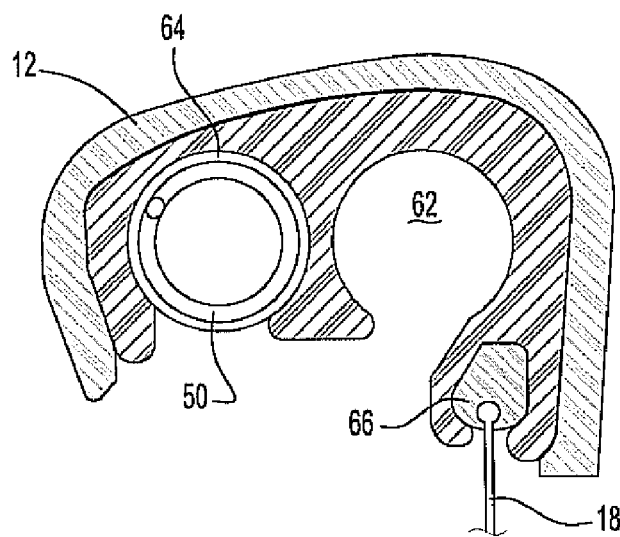
FIG. 6 is a cross-sectional view along the portion 6-6 showing the biasing member and sliding member disposed within the channel.

An automotive vehicle 10 is provided having a sunshade assembly 20 operable to smoothly retract from an open position to a closed position. FIG. 2 shows the movement of the sunshade assembly from an open position to a closed position. The sunshade assembly 20 includes an elongated rotatable member located within the base profile 13, a flexible shade 18 and an elongated extension member 12. The flexible shade 18 has a first edge 17 and a second edge 19. The first edge 17 is connected to the elongated rotatable member wherein the flexible shade 18 is operable to wrap around the elongated rotatable member. The second edge 19 is connected to the elongated extension member 12 wherein the elongated extension member 12 travels up and down along a vehicle window 56.

The elongated extension member 12 moves by means of the support arms 14. In this embodiment, the sunshade assembly 20 includes just two support members 14. The two support members 14 connect to the base profile 13 at the pivot point 15. The support arms 14 rotate about the pivot point 15 by means of the rotating gear motor assembly 30, 33. The arms 14 rotate about the pivot point 15 thereby pushing the elongated extension member 12 along the window 56. When the support arms 14 are pushing the elongated extension member 12 up the window 56, the flexible shade 18 is unrolling about the elongated rotatable member. Once the arms 14 are at a position substantially perpendicular to the base profile 13, the sunshade assembly 20 and flexible shade 18 are substantially covering the vehicle window 56. In the present embodiment, the support arms 14 do not cross in the closed position, as shown in FIG. 2. In an alternative embodiment, the support arms require the use of multiple channels and cross when the support arms 14 are in a closed position.

Support arms 14d and elongated extension member 12 depict the current positioning of the prior art. From the positioning of support arm 14d and elongated extension member 12, the sunshade assembly shows difficulty and unsmooth retracting and closing of the flexible shade 18 and the sunshade assembly 20.

The force assist mechanism operable to create smooth travel for retraction and closing of the flexible shade 18 includes an end cap 54, a biasing member 50, connector 66 and a sliding member 22 slidable within a channel 62, 64 of the elongated extension member 12. The prior art showed sliding member 22 coming into contact with the end cap 54 when the sunshade assembly 20 and the flexible shade 18 was in a fully open position. The biasing member 50, typically a spring, acts as a spacer and as an additional force mechanism to push closed the sunshade assembly 20 by means of pushing the sliding member 22 thereby forcing the sunshade assembly 20 to a retracted or closed position.

The sliding member 22 is slidable within the channel or track 62 or the channel or track 64. The elongated extension member 12 includes at least one track 62, 64. At either end of the extension member 12, an end cap 54 is positioned. The sliding member 22 is pivotally attached to the support arm 14 at pivot point 60. The support arm 14 moves the sliding member 22 and thereby forces the elongated extension member 12 upwards to open the sunshade assembly 20 to an open position whereby the flexible shade 18 covers the vehicle window 56. Upon retraction of the flexible shade 18, the support arms 14 move the sliding member 22 to lower the extension member 12 to a retracted and closed position. The biasing member or spring 50 adds extra force to a first end 23 of the sliding member 22. The extra force provided by the biasing member 50 is needed to overcome the moment due to the friction of the slider 22 moving from an open position to a closed position. In the open position the sliding member 22 contacts the biasing member 50 which contacts a support surface 68 of the end cap 54. Upon retraction, the biasing member 50 pushes on the first surface 23 of the sliding member 22 and on the support surface 68 of the end cap 54 to assist pushing the sliding member 22 to force retraction and closing of the sunshade assembly 20. The gear is the main source of force on the sliding member 22, however, the biasing member 50 acts significantly to overcome the friction of the sliding member 22 within the track to facilitate smoother movement of the sliding member 22.

Figure 7:
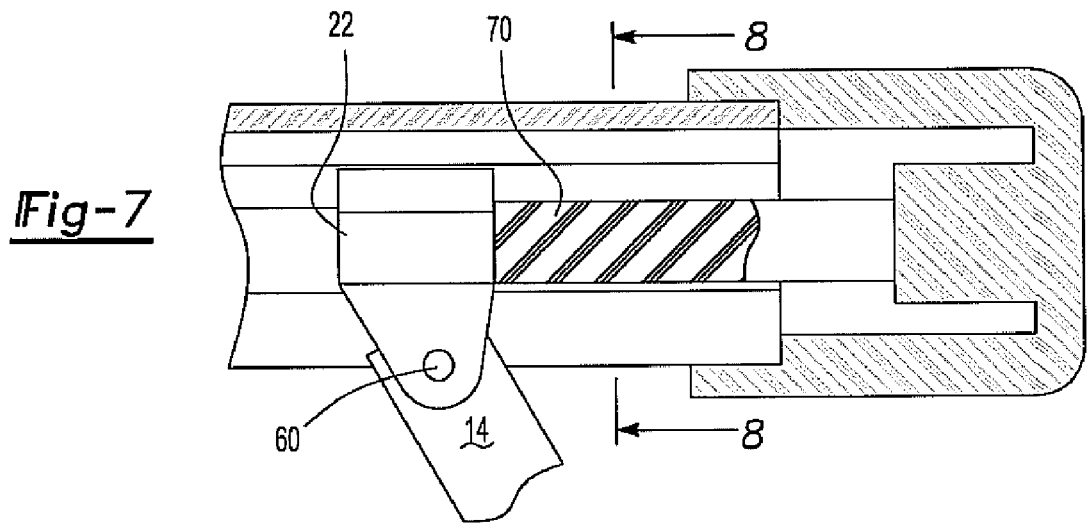
FIG. 7 is a side view showing an alternative embodiment of the sunshade assembly force assist mechanism.
Figure 8:
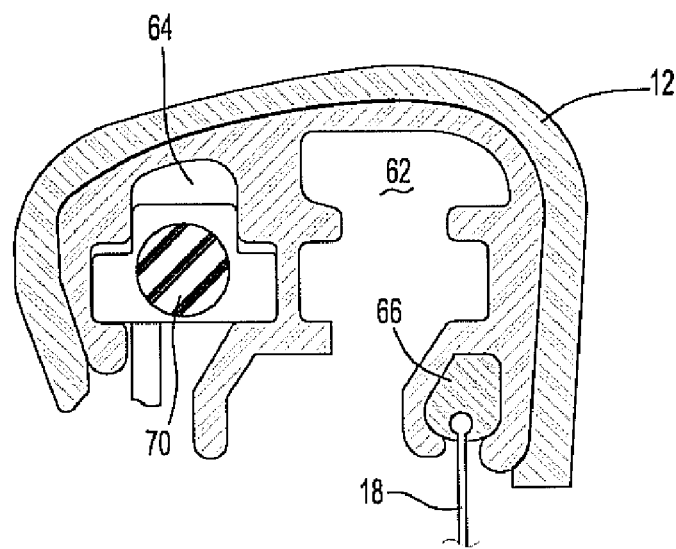
FIG. 8 is a cross-sectional view along portion 8-8 of FIG. 7 showing an alternative embodiment of the force assist sliding mechanism.

As shown in FIG. 2, the support arms 14 move the elongated extension member 12 from an open position to a closed position (32, 34). Decreased travel distance 16*a*, 16*b* depicts the space added by the biasing member 50. In an alternative embodiment, a spacer 70 is positioned within the channels 62, 64 between the sliding member 22 and the end cap 54. In this embodiment, the spacer 70 has a circular cross section. In an alternative embodiment, the spacer has a cross section which mimics the shape of the channel 64. The spacer 70 is depicted in FIGS. 7 and 8. The spacer 70 increases the distance between the sliding member 22 and the end cap 54 thereby decreasing the required travel distance of the sliding member 22 within the elongated extension member 12 during closing or retraction of the sunshade assembly 20.

The spacer 70 also decreases the angle of the arms 14 thereby decreasing the required travel distance of the sliding member 22 within the elongated extension member 12 during closing or retraction of the sunshade assembly 20. The increased distance 16*a*, 16*b* provided by the spacer 70 overcomes the moment required to retract the sunshade assembly 20. The added distance 16*a*, 16*b* provided by the spacer 70 eliminates the sticking or stubborn movement of the sliding member 22 within the channels 62, 64 thereby providing smooth movement of the sliding member 22 within the tracks or channels 62, 64.

FIG. 2 shows the various positions of the elongated extension member 12, the sliding member 22, and the support arms 14 during opening and closing of the sunshade 20 and flexible shade 18. Position A shows the sunshade assembly 20 in the opened position wherein a biasing member 50 or a stopper 70 is in position. Upon closing, position B shown by support arm 14*b*, sliding member 22*b*, and elongated extension member 12*b* wherein the sunshade assembly 20 is in a half closed position. Position C is shown by the placement of support arm 14*c*, sliding member 22*c*, and elongated extension member 12*c*. Position C is shown at a position wherein the sunshade assembly 20 is near a fully retracted or closed position.

The invention is not restricted to the illustrative examples and embodiments described above. The embodiments are not intended as limitations on the scope of the invention. Methods, apparatus, compositions, and the like described herein are exemplary and are not intended as limitations on the scope of the invention. Changes therein and other uses will occur to those skilled in the art. The scope of the invention is defined by the scope of the appended claims.

We claim:

1. An automotive vehicle sunshade assembly for controlling light entering a vehicle interior, the sunshade assembly comprising:
    an elongated rotatable member;
    a flexible shade having a first edge and a second edge, the first edge connected to the elongated rotatable member;
    an elongated extension member having a first end and a second end, the elongated extension member further having at least one channel, the second edge of the flexible shade connected to the elongated extension member;
    at least one support member extending between the elongated extension member and a base profile, the at least one support member having a first end and a second end, the first end of the support member pivotable about a first pivot point on the base profile, the second end of the support member slidable within the at least one channel of the elongated extension member;
    at least one end cap, the at least one end cap affixed to the first end of the elongated extension member; and
    a biasing member positioned within the at least one channel disposed between the first end of the support member and the at least one end cap, the biasing member operable to force movement of the at least one support member.

2. The sunshade assembly of claim 1, wherein the at least one end cap is affixed to the second end of the elongated extension member.

3. The sunshade assembly of claim 2, wherein a second biasing member is positioned within the at least one channel disposed between the at least one support member and the at least one end cap affixed to the second end of the elongated extension member.

4. The sunshade assembly of claim 1, wherein the biasing member is a spring.

5. The sunshade assembly of claim 4, wherein the spring is elongated.

6. The sunshade assembly of claim 1, wherein the at least one support member includes a sliding member operable to slide within the at least one channel.

7. The sunshade assembly of claim 6, wherein the sliding member is pivotally connected to the at least one support member.

8. An automotive vehicle sunshade assembly for controlling light entering a vehicle interior, the sunshade assembly comprising:
    an elongated rotatable member;
    a flexible shade having a first edge and a second edge, the first edge connected to the elongated rotatable member;
    an elongated extension member having a first end and a second end, the elongated extension member further having at least one channel, the second edge of the flexible shade connected to the elongated extension member;
    at least one support member extending between the elongated extension member and a base profile, the at least one support member having a first end and a second end, the first end of the support member pivotable about a first pivot point on the base profile, the second end of the support member slidable within the at least one channel of the elongated extension member;
    at least one end cap, the at least one end cap affixed to the first end of the elongated extension member; and a stopper positioned within the at least one channel disposed between the first end of the support member and the at least one end cap operable to prevent movement of the at least one support member.

9. The sunshade assembly of claim 8, wherein the stopper is elongated.

10. The sunshade assembly of claim 9, wherein the stopper has a circular cross section.

11. The sunshade assembly of claim 9, wherein the stopper has a rectangular cross section.

12. The sunshade assembly of claim 8, wherein the stopper is made of a polymer material.

13. The sunshade assembly of claim 8, wherein the stopper is metal.

14. The sunshade assembly of claim 8, wherein the at least one support member includes a sliding member operable to slide within the at least one channel.

15. The sunshade assembly of claim 14, wherein the sliding member is pivotally connected to the at least one support member.

* * * * *